(12) United States Patent
Sovenyi

(10) Patent No.: US 7,639,598 B2
(45) Date of Patent: Dec. 29, 2009

(54) SIMULTANEOUS FULL-DUPLEX COMMUNICATION OVER A SINGLE ELECTRICAL CONDUCTOR

(76) Inventor: Szabolcs Sovenyi, 24951 Woodridge Dr., Apt. 311, Farmington Hills, MI (US) 48335

( * ) Notice: Subject to any disclaimer, the term of this patent is extended or adjusted under 35 U.S.C. 154(b) by 425 days.

(21) Appl. No.: 11/668,236

(22) Filed: Jan. 29, 2007

(65) Prior Publication Data
US 2007/0177679 A1 Aug. 2, 2007

Related U.S. Application Data

(60) Provisional application No. 60/763,694, filed on Jan. 31, 2006.

(51) Int. Cl.
*H04J 11/00* (2006.01)

(52) U.S. Cl. ................ 370/203; 370/276

(58) Field of Classification Search ......... 370/276–295, 370/241–253, 463, 203; 375/295–315, 316–352
See application file for complete search history.

(56) References Cited

U.S. PATENT DOCUMENTS

| | | | |
|---|---|---|---|
| 4,087,654 A | 5/1978 | Mueller | |
| 4,259,982 A | 4/1981 | Bartels | |
| 4,393,494 A | 7/1983 | Belforte et al. | |
| 4,477,896 A * | 10/1984 | Aker | 370/201 |
| 4,638,473 A | 1/1987 | Cooperman et al. | |
| 4,698,800 A * | 10/1987 | Cavaliere et al. | 370/284 |
| 4,714,912 A | 12/1987 | Roberts et al. | |
| 4,726,054 A | 2/1988 | Molnar et al. | |
| 4,731,821 A | 3/1988 | Jackson, III | |
| 4,740,952 A | 4/1988 | Vernieres et al. | |
| 4,835,343 A | 5/1989 | Graef et al. | |
| 4,835,765 A | 5/1989 | Bergmans et al. | |

(Continued)

OTHER PUBLICATIONS

M. Hsieh and G. E. Sobelman. "Simultaneous Bi-directional Signaling with Adaptive Pre-emphasis". Department of Electrical and Computer Engineering, University of Minnesota (believed to have been offered for sale, publicly used, and/or published prior to the filing date of this application).

(Continued)

*Primary Examiner*—Kwang B Yao
*Assistant Examiner*—Obaidul Huq
(74) *Attorney, Agent, or Firm*—Gifford, Krass, Sprinkle, Anderson & Citkowski, P.C.

(57) ABSTRACT

Simple, inexpensive, general-purpose devices and methods achieve simultaneous, full-duplex and bi-directional communication of analog, digital or audio signals across a single conductor. "Sifudu" transceivers, which stands for "simultaneous and full-duplex," reduce the number of cables necessary for transferring information between two or more terminals at a given rate, and/or facilitate information transfer at a higher rate than traditional circuits across the same number of cables. The transceivers can accommodate both digital and analog signals of arbitrary polarity. Since a sifudu circuit is capable of transmitting analog signals, it is also capable of transmitting digital signals in frequency, phase, or amplitude shift keyed form, thus opening the possibility of realizing higher baud rate than other simultaneous bidirectional communication systems that transfer digital data only, one bit at a time in each direction. The transceivers can be connected into a multi-terminal network configurations including chain, star, tree, woods topologies, alone or in combination.

25 Claims, 9 Drawing Sheets

U.S. PATENT DOCUMENTS

| | | | |
|---|---|---|---|
| 5,216,667 A * | 6/1993 | Chu et al. | 370/276 |
| 5,248,919 A | 9/1993 | Hanna et al. | |
| 5,399,940 A | 3/1995 | Hanna et al. | |
| 5,451,923 A | 9/1995 | Seberger et al. | |
| 5,465,397 A | 11/1995 | Pickert | |
| 5,485,397 A | 1/1996 | Yamazato et al. | |
| 5,515,038 A | 5/1996 | Smith | |
| 5,521,908 A * | 5/1996 | Younce et al. | 370/286 |
| 5,604,450 A | 2/1997 | Borkar et al. | |
| 5,637,930 A | 6/1997 | Rowen et al. | |
| 5,657,324 A | 8/1997 | Itkin et al. | |
| 5,666,354 A | 9/1997 | Cecchi et al. | |
| 6,154,488 A | 11/2000 | Hunt | |
| 6,172,992 B1 | 1/2001 | Hoffmann et al. | |
| 6,373,908 B2 | 4/2002 | Chan | |
| 6,617,871 B2 | 9/2003 | Stark | |
| 6,625,206 B1 | 9/2003 | Doblar | |
| 6,744,831 B2 | 6/2004 | Chan | |
| 6,791,356 B2 | 9/2004 | Haycock et al. | |
| 6,803,790 B2 | 10/2004 | Haycock et al. | |
| 6,876,229 B1 | 4/2005 | Barus et al. | |
| 6,901,336 B2 | 5/2005 | Tesdahl et al. | |
| 6,925,091 B1 | 8/2005 | Sjoberg et al. | |
| 7,095,756 B2 | 8/2006 | Binder et al. | |
| 2004/0047370 A1 * | 3/2004 | Pessoa et al. | 370/526 |
| 2004/0105504 A1 | 6/2004 | Chan | |
| 2004/0120405 A1 * | 6/2004 | Jaussi et al. | 375/257 |
| 2005/0084020 A1 * | 4/2005 | Kikuchi | 375/257 |

OTHER PUBLICATIONS

A. Freed. "Bi-directional AES/EBU Digital Audio and Remote Power over a single Cable". (believed to have been offered for sale, publicly used, and/or published prior to the filed of this application) http://www.cnmat.berkeley.edu/AES1999/docs/wTriaxAE.html.

W.J. Dally. "EE273 Lecture 9 Advanced Signaling". Computer Systems Laboratory, Stanford University. Oct. 21, 1998.

* cited by examiner

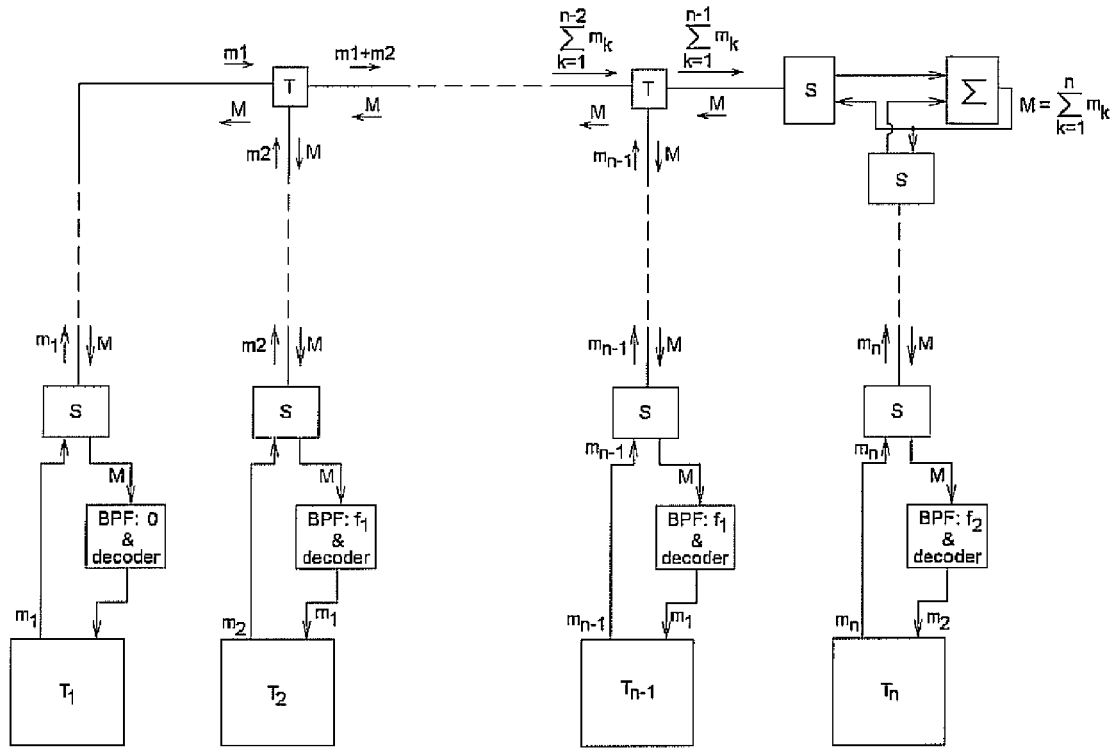

FIGURE 14

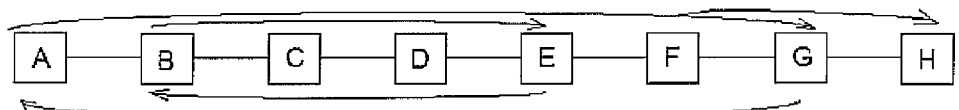

If all stations are connected to the same common ground, the communication circuit makes it possible to send multiple signals across a single conductor at the same time, e.g.:
Station A sends a message to H and E
Station B sends a message to C
Station C receives a signal from B and sends a signal to B and F
Station D receives a signal from G and sends a signal to G
Station G sends a message to D

FIGURE 15

SIMULTANEOUS FULL-DUPLEX COMMUNICATION OVER A SINGLE ELECTRICAL CONDUCTOR

REFERENCE TO RELATED APPLICATIONS

This application claims priority from U.S. Provisional Patent Application Ser. No. 60/763,694, filed Jan. 31, 2006, the entire content of which is incorporated herein by reference.

FIELD OF THE INVENTION

This invention relates generally to bidirectional communications and, in particular, to simultaneous, full-duplex communications over a single conductor. The invention further provides for three or more communication terminals connected by bidirectional links arranged as networks in various topologies.

BACKGROUND OF THE INVENTION

Traditionally, two wires, one for the signal and another one for the ground, are necessary to realize communication between two terminals. Such transmission systems are termed two-wire circuits, and may use, for example, a twisted pair, or a coaxial cable as a transmission medium. Such systems are capable of transmitting signals in one direction at a time, possibly alternating between different directions, with buffering at the two ends. A pair of two-wire circuits form a four-wire circuit, which is already capable of simultaneous, uninterrupted full-duplex communication. Another family of communication tools, fiber optic devices, are capable of transmitting information in both directions across a single glass fiber at the same time.

The telecommunication and computer industries have made numerous successful attempts to increase the amount of information a wire pair can transfer, or, to decrease the number of wires necessary to transmit information at a given rate. For instance, U.S. Pat. Nos. 6,803,790 and 6,791,356 propose a bidirectional digital port with a clock channel used for synchronization. The port allows digital circuits to communicate with each other simultaneously. Further examples include the full-duplex token-ring based telephone system described in U.S. Pat. No. 6,611,537, and the digital telephones described in U.S. Pat. Nos. 4,726,054 and 6,925,091.

Single-wire digital telephone systems are presented in U.S. Pat. Nos. 4,731,821 and 4,835,765. U.S. Pat. No. 5,451,923 describes bidirectional digital communication over a pair of conductors. The same pair of conductors are also used for instrument diagnostics and control. Nowadays, even some refrigerators are equipped with digital bidirectional communication systems, as shown in U.S. Pat. No. 5,485,397. The communication process described in U.S. Pat. No. 5,485,397 is not simultaneous, however.

The time-multiplexing of signals sent through numerous wires makes it possible to reduce the number of wires, at the expense of transmission rate. Multiplexing is also possible in frequency domain, whereby different frequency modulated signals are sent on different carrier frequencies. It is also customary to divide messages into packets, then transmit the packets at a high rate, often utilizing the same transmission medium for sending packets of several communication processes one after another, and finaly, to assemble the original message from the packets at the destination. Such systems are often implemented in land-based digital phone networks.

Several circuit arrangements capable of realizing simultaneous, full-duplex communication between two or more terminals have been patented in the past. Most of these communicate digital high or low voltage levels only. Also, most of these systems are relatively complex and require various filters, which lowers the noise immunity of the system. A digital, full-duplex serial bus capable of sending data in packets is disclosed in U.S. Pat. No. 6,411,628. Full-duplex communication can also be realized across the three-phase electrical power lines, as shown in U.S. Pat. No. 6,154,488. The system uses more than one wire for communication. U.S. Pat. No. 5,515,038 also presents a digital communication system that uses the three phase power lines.

A C-MOS bi-directional, differential communications link is described in U.S. Pat. No. 5,666,354. This system is directed to digital communications. The full-duplex computer network modem prescribed by CCITT Recommendation V.26 ter. is also capable of realizing simultaneous digital full-duplex communication.

U.S. Pat. Nos. 6,373,908 and 6,744,831 describe a simultaneous, full-duplex communication system developed for digital signals. The signals sent through the twisted pair connecting two terminals are analog, and necessitate the use of a transformer at each end of the twisted pair. The transformer is typically large, expensive, heavy, and not possible to integrate into a chip.

U.S. Pat. No. 5,657,324 describes a bidirectional communication system, primarily geared to communicate digital signals across a single cable in two directions simultaneously. The system works with positive voltage signals only. The transceivers in a two-terminal network are called master and slave, and their functions are not symmetrical. This disadvantage is manifested when the transceivers are connected into a network. In that case, all slaves listen to the master simultaneously, but only one slave can talk to the master at a time. The slaves cannot talk to each other.

SUMMARY OF THE INVENTION

This invention resides in a simple, inexpensive, general-purpose devices and methods for achieving simultaneous, full-duplex and bi-directional communication of analog, digital or audio signals across a single conductor. The invention is based upon "sifudu" transceivers, which stands for "simultaneous and full-duplex." Use of the transceivers reduces the number of cables necessary for transferring information between two or more terminals at a given rate. Alternatively, they can transfer information at a higher rate than traditional circuits across the same number of cables. The sifudu transceivers can also be connected into a multi-terminal network configurations including chain, star, tree, woods topologies alone or in combination.

The sifudu transceivers can accomodate both digital and analog signals of arbitrary polarity. Since a sifudu circuit is capable of transmitting analog signals, it is also capable of transmitting digital signals in frequency, phase, or amplitude shift keyed form, thus opening the possibility of realizing higher baud rate than other simultaneous bidirectional communication systems that transfer digital data only, one bit at a time in each direction. The system not only allows one terminal to talk to more than one other terminals at a time, since there is no designated master or slave, any terminal can take on the role of the transmitter or the receiver, or both any time.

A system for achieving simultaneous, full-duplex communication between two terminals over a single electrical conductor, according to the invention comprises a first transceiver terminal $T_1$ having a first input for receiving a first signal x, and a second transceiver terminal $T_2$ having a second input for receiving a second signal y. A first communication circuit $C_1$ in $T_1$ is disposed between the first input and a point A for transmitting a signal representative of x from A to $T_2$ over the single electrical conductor, and a second communication circuit $C_2$ in $T_2$ is disposed between the second input and a point B for transmitting a signal representative of y from B to $T_1$ over the single electrical conductor. A first estimator circuit $E_1$ in $T_1$ is used for measuring one or more variables $s_{11}, s_{12}, \ldots s_{1P}$ relative to the point A, and a second estimator circuit $E_2$ in $T_2$ is used for measuring one or more variables $s_{21}, s_{22}, \ldots s_{2Q}$ relative to the point B; The first estimator is operative to output a signal $\hat{y}=f_{1e}(s_{11}, \ldots, s_{1P}, x)$, and the second estimator being operative to output a signal $\hat{x}=f_{2e}(s_{21}, \ldots, s_{2Q}, y)$, where $f_1(s_{11}, \ldots, s_{1P}, x, y)=0$; $f_2(s_{21}, \ldots, s_{2Q}, x, y)=0$, and $\hat{x}$, $\hat{y}$ are estimates of x and y, respectively.

In a voltage-based system the first and second communication circuits include resistors, and the variables include the voltages developed across each resistor. In a current-based system the first and second communication circuits include current-sensing components, and the variables include the currents measured by the current-sensing components. Such components may include, for example, a resistor and differential amplifier connect across the terminals thereof. An intermediate circuit containing active or passive components may be connected between points A and B.

In a representative network configuration, the system further comprises a central communication node including a plurality of transceiver terminals, and a plurality of stations, each sending messages through a transceiver terminal in simultaneous, full-duplex communication with a respective one of the transceiver terminals of the central communication node. The central node is operative to send the sum of all incoming messages back to each station, and each station includes a decoder to extract the message intended for that node from the sum received from the central node. In one embodiment, the messages from each station are sent using a different carrier frequency, and the decoder in each station includes a band pass filter.

BRIEF DESCRIPTION OF THE DRAWINGS

FIG. 14 shows "n" terminal communication network of linear (or chain) structure;

FIG. 15 shows how a chain structure is capable of carrying three or more messages on a single cable;

DETAILED DESCRIPTION OF THE INVENTION

Figure 1:
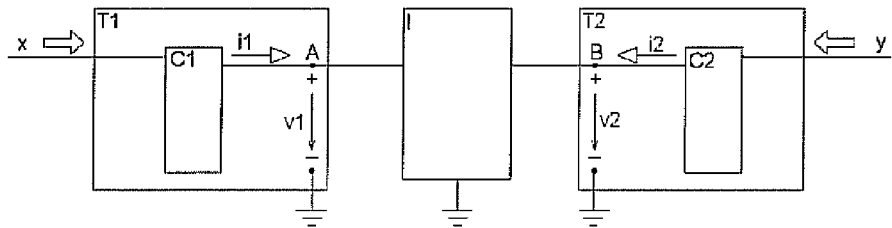
FIG. 1 illustrates the general arrangement of two communication terminals of the present invention.

This invention is directed to the realization of simultaneous, full-duplex communication between points A and B, as well as bidirectional links arranged as networks. Referring to FIG. 1, a single wire connects points A and B with intermediate circuit I between. Terminals $T_1$ and $T_2$ and the intermediate circuit I may contain active and passive components, resistors, operational amplifiers (op-amps) capacitors, various semiconductor devices, and so on. Signals x and y, which may be currents or voltages, arrive at terminals $T_1$ and $T_2$. The voltages and currents are represented by time domain, real quantities in this disclosure.

Inside terminal $T_1$, communication circuit $C_1$ sends a signal to terminal $T_2$ through intermediate circuit I. This signal is not necessarily the same as x. Inside terminal $T_2$ a communication circuit $C_2$ sends a signal to terminal $T_1$ through intermediate circuit I. The potential of the connection cable in terminal $T_1$ is $v_1$, the current flowing through it is $i_1$. Similar notation is introduced in terminal $T_2$.

In terminal $T_1$ some signals, possibly including v1, i1 and x, are available for measurement, Likewise, in terminal $T_2$, some signals, possibly including $i_1$, $v_2$ and y, are available for measurement. However, the only links between terminals $T_1$ and $T_2$ are the common ground and the cable between points A and B, with the intermediate circuit I located between the two. No information is transmitted through the ground and all the information transmitted between terminals $T_1$ and $T_2$ is transmitted through the cable between points A and B. In other words, short of any signal transmitted through the wire between points A and B, the signals in terminal $T_2$ are not available for measurement in terminal $T_1$, and vice versa. Apart from x, the signals available for measurement in terminal $T_1$ will be denoted $s_{11}, s_{12}, \ldots s_{1P}$. Apart from y, the signals available for measurement in terminal $T_2$ will be denoted $s_{21}, s_{22}, \ldots s_{2Q}$.

In the sifudu system, circuits $T_1$, $T_2$ and I are built such that a function $f_1$ will fully describe the relationship between variables $s_{11}, \ldots, s_{1P}$, x and y:

$$f_1(s_{11}, \ldots, s_{1P}, x, y)=0$$

Function $f_1$ may be a vector function of several equations. From function $f_1$ an explicit function $f_{1e}$ for y can be expressed for computing an estimate $\hat{y}$ based on the quantities measurable in terminal $T_1$:

$$\hat{y}=f_{1e}(s_{11}, \ldots, s_{1P}, x) \tag{1}$$

Similarly, in case of terminal $T_2$:

$$f_2(s_{21}, \ldots, s_{2Q}, x, y)=0$$

and $$\hat{x}=f_{2e}(s_{21}, \ldots, s_{2Q}, y) \tag{2}$$

If the circuits $T_1$, $T_2$ and I satisfy equations (1) and (2) simultaneously, and equations (1) and (2) uniquely determine the estimates $\hat{y}$ and $\hat{x}$, respectively then the system formed by circuits $T_1$, $T_2$ and I is a sifudu system.

If equations (1) and (2) are simultaneously satisfied, an estimate $\hat{y}$ of y is available in terminal $T_1$ and an estimate $\hat{x}$ of signal x is available in terminal $T_2$ simultaneously. Therefore, simultaneous, full-duplex communication will be realized, as shown in FIG. 2.

Figure 2:
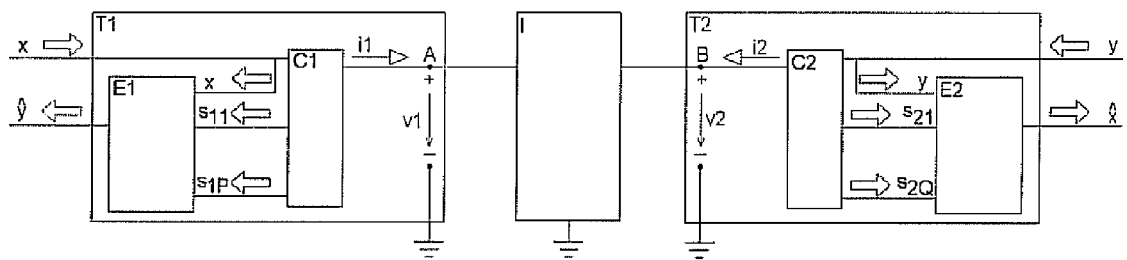
FIG. 2 illustrates the principle of sifudu communication.

The block arrows indicate information flow in FIG. 2. Estimators $E_1$ and $E_2$ inside terminals $T_1$ and $T_2$ compute the estimates $\hat{y}$ and $\hat{x}$, respectively. The system shown in FIG. 2 realizes simultaneous full-duplex communication.

EXAMPLES

Two example circuits will illustrate the concept of sifudu communication. Those of skill in the art will appreciate that other alternatives are possible through appropriate modification without departing from the invention. Accordingly, the drawings and description that follows are to be regarded as illustrative in nature and not as restrictive.

Voltage Sifudu

Figure 3:
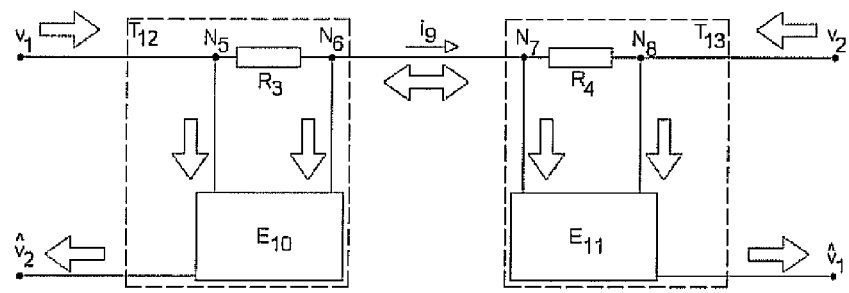
FIG. 3 shows a simple example of voltage sifudu circuits.

Let us consider two resistors $R_3$ and $R_4$ connected in series, as shown in FIG. 3.

Resistors $R_3$ and $R_4$ play the role of communication circuits $C_1$ and $C_2$, respectively. They will be called drop resistors because of the voltage drop they develop. A cable of negligible resistance realizes intermediate circuit I. In practice, circuit I may have some resistance, parasitic capacitance and/or inductance of the connection cable between the two terminals. It is nevertheless possible to find simple intermediate circuits I as cable models such that equations (1) and (2) will hold true and simultaneous, full-duplex communication will tale place in the circuit. In that case, the parameters of the intermediate circuit I will show up in equations (1) and (2).

The potentials $v_5$, $v_6$, $v_7$ and $v_8$ at nodes $N_5$, $N_6$, $N_7$ and $N_8$, respectively, are assumed to be available for measurement. Estimators $E_{10}$ and $E_{11}$ compute estimates $\hat{v}_1$ and $\hat{v}_2$, respectively. The estimators work as follows. Because the current $i_9$ across impedances $R_3$ and $R_4$ is the same, one may write:

$v_1 = v_5$ and $v_2 = v_8$, so:

$$\frac{v_5 - v_6}{R_3} = \frac{v_7 - v_8}{R_4} = \frac{v_5 - v_8}{R_3 + R_4}$$

$$\frac{v_1 - v_6}{R_3} = \frac{v_7 - v_2}{R_4} = \frac{v_1 - v_2}{R_3 + R_4}$$

$$\frac{v_1 - v_6}{R_3} = \frac{v_1 - v_2}{R_3 + R_4}$$

$$v_2 = v_6 \cdot \frac{R_3 + R_4}{R_3} - v_1 \cdot \frac{R_4}{R_3}$$

After rearrangement:

In other words, based on measurements of potentials $v_6$ and $v_1$ an estimate $\hat{v}_2$ for the voltage $v_2$ can be computed:

$$\hat{v}_2 = v_6 \cdot \frac{R_3 + R_4}{R_3} - v_1 \cdot \frac{R_4}{R_3}$$

A similar derivation yields an estimate $\hat{v}_1$ for the voltage $v_1$:

$$\hat{v}_1 = v_7 \cdot \frac{R_4 + R_3}{R_4} - v_2 \cdot \frac{R_3}{R_4}$$

The last two equations show how the estimators $E_{10}$ and $E_{11}$ are preferably constructed. It is important to note that the circuit presented herein is only one of many possible implementations. In a two drop-resistor application, upper and lower bounds constrain the suitable values for the drop-resistors.

In considering the lower bounds first, voltages $v_1$ and $v_2$ are provided by some circuit components in the environment. These voltage sources may be logic gates, signal conditioning circuits, and so on, and they may be far from ideal. The resistors must be large enough to keep the current $i_9$ between two voltage sources below their maximum limits. Also, the resistors must be large enough to ascertain that the output voltage of the voltage sources will not drop significantly due to the load.

If the voltage sources are realized by voltage follower circuits built with conventional instrumentation operational amplifiers (op-amps), e.g. AD822AN (manufactured by Analog Devices Inc., Corporate Headquarters, Building Three, Three Technology Way, Norwood, Mass., USA), then drop-resistor values above 1 kΩ will be sufficiently large. There is a further reason for choosing a large drop-resistor value. If the cable resistance between nodes $N_6$ and $N_7$ varies between a fraction of an Ohm and, say, 10Ω from one application to another, then a drop-resistor value orders of magnitude higher will ascertain that the communication circuits will be insensitive to such variations in cable resistance. This consideration broadens the utility of the circuit. If the circuit is to be used with a cable of higher, known resistance than a few Ohms, then equations (1) and (2) can be modified to consider this. Note that the component values in the various examples are representative only, and that different circuits and components would be apparent to those of skill in the relevant art.

There is also an upper bound on the resistor values. The estimators $E_{10}$ and $E_{11}$ will be realized by op-amp circuits. To male sure the input current of the estimators would not influence the potentials of nodes $N_5$, $N_6$, $N_7$ and $N_8$, the resistors must have values at least two orders of magnitude smaller than that of the input impedance of the op-amps. The input impedance of op-amps is typically 1 MΩ or greater. Let us set $R_3 = R_4 = 10$ kΩ.

Figure 4:
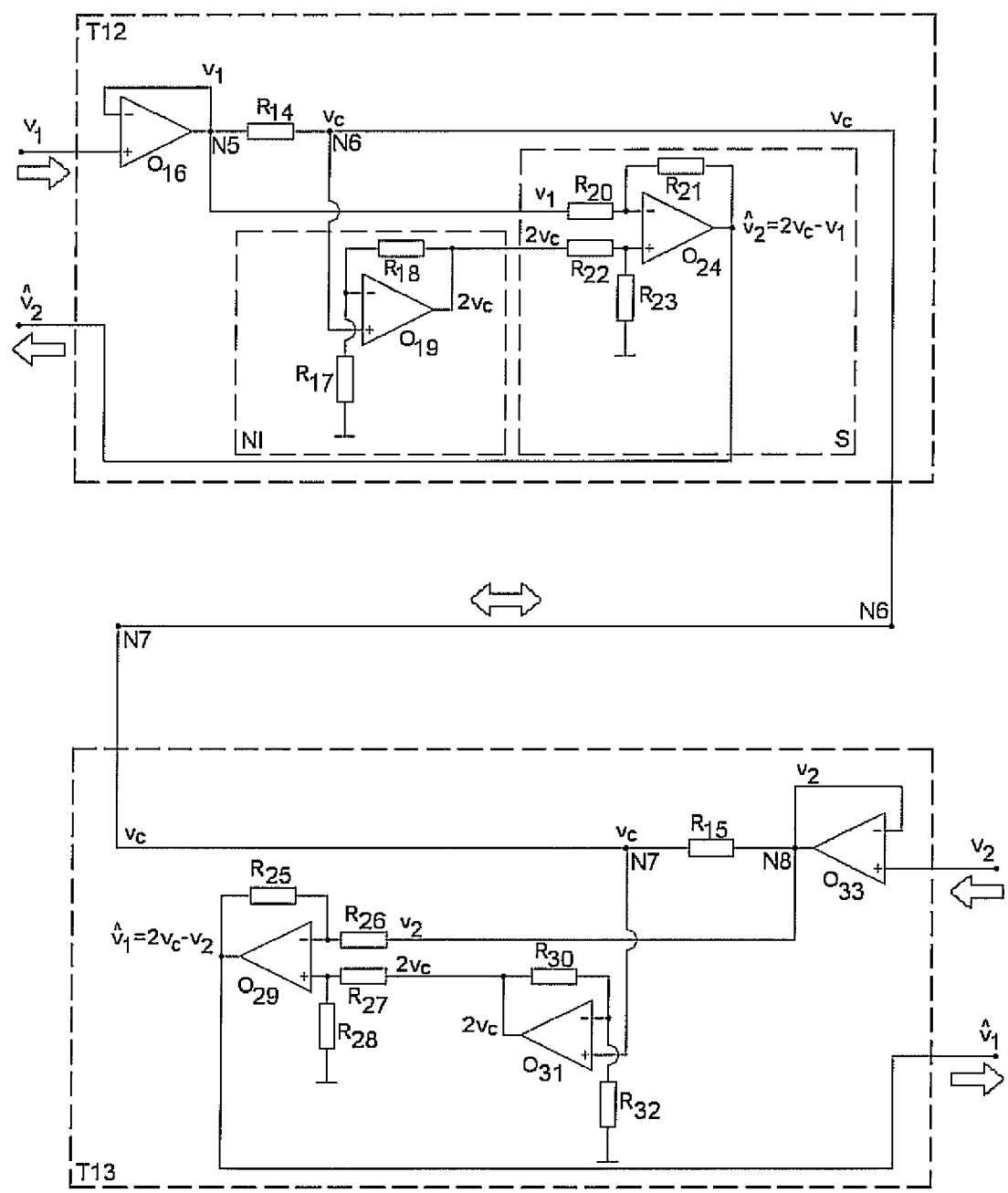
FIG. 4 is an example of voltage sifudu.

Introducing a notation for the cable potential $v_c = v_6 = v_7$, the estimate $\hat{v}_2$ of the voltage $v_2$ can be computed as follows:

$$\hat{v}_2 = v_6 \cdot \frac{R_3 + R_4}{R_3} - v_1 \cdot \frac{R_4}{R_3} = 2v_c - v_1$$

$$\hat{v}_1 = 2v_c - v_2$$

similarly:

FIG. 4 shows the circuit diagram of a transceiver pair that works according to the last two equations. Again, it is to be emphasized that this is just one of the many possible implementations. Terminals $T_{12}$ and $T_{13}$ shown in the dashed rectangles form the symmetrical sifudu pair. The block arrows indicate the direction of information flow.

Drop-resistors $R_{14}$ and $R_{15}$ split the voltage difference $v_1 - v_2$ into two halves, yielding a cable potential $v_c$ measurable on nodes $N_6$ and $N_7$. Again, this is for applications where the resistance of the cable between nodes $N_6$ and $N_7$ is negligible compared to that of drop-resistors $R_{14}$ and $R_{15}$. The other resistors function as accessories of the operational amplifier circuits that perform arithmetic operations. There are several alternatives for configuring the op-amp circuits to perform the necessary arithmetic operations, one is shown on FIG. 4 as an illustration. In this configuration, all the resistors are chosen identical with their value set to 10 kΩ. Again, as an example, the AD822AN is chosen for all op-amps. Other operational amplifiers, e.g. the AD622 may yield similar or perhaps better results.

Because the two terminals are symmetrical or substantially identical, operation of only one of the terminals is discussed. For terminal $T_{12}$, a voltage follower op-amp $O_{16}$ is used as a buffer on the input signal $v_1$. If the external voltage source has sufficiently low output resistance, the buffer can be omitted. Resistors $R_{17}$ and $R_{18}$ and op-amp $O_{19}$ form non-inverting amplifier circuit NI with a voltage amplification of two. The input of the non-inverting amplifier is the cable voltage, $v_c$, while the output is the double, $2v_c$ of the cable voltage. The non-inverting op-amp circuit connects to node $N_6$ with its non-inverting input, so it draws minimal current from $N_6$ and does not influence the voltage drop across drop-resistor $R_{14}$.

Resistors $R_{20}$, $R_{21}$, $R_{22}$ and $R_{23}$ and op-amp $O_{24}$ form the subtracting circuit S. Due to the four identical resistors, the output of the circuit is the difference $2v_c-v_1$ between the double $2v_c$ of the cable voltage $v_c$ and the input voltage $v_1$. The result is the estimate $\hat{v}_2$ of the input voltage $v_2$ of the other terminal, $T_{13}$. Therefore, the input voltage of terminal $T_{12}$ is measurable as the output of terminal $T_{13}$ and vice versa, the input voltage of terminal $T_{13}$ is measurable as the output of terminal $T_{12}$. Hence full-duplex, simultaneous communication has been realized across a single cable between nodes $N_6$ and $N_7$.

Careful attention should be paid to op-amp circuits $O_{19}$ and $O_{31}$, as they double their input voltages. The power supply lines of these circuits should allow the output to vary without saturation. For the same reason, the power supply of op-amp circuits $O_{29}$ and $O_{24}$ should allow the circuit to receive input in the same range. Also, if any of the input voltages $v_1$ and $v_2$ are expected to get close to or reach 0V, then the negative power supply line of the op-amps must be lower than 0V to allow for this variation. In summary, all op-amps should be provided a power supply that allows them to receive input and send output signals without saturation. In this case the positive power supply of the op-amps was +24VDC, and the negative was connected to ground.

Current Sifudu

The sifudu transceiver pair can also be realized based on a different circuit arrangement. In this case the signals to be communicated are currents rather than voltages. Consider the circuit shown in FIG. 5.

Terminals $T_9$ and $T_{10}$ are connected by a single cable between nodes $N_5$ and $N_6$. Other circuits in the environment provide the communication current signals $i_1$ and $i_2$ for terminals $T_9$ and $T_{10}$, respectively. These current signals are measurable inside the terminals, as indicated by the Ampere meters. The arrows of the Ampere meters are connected to the estimators with lines that indicate the current readout of the meters. The cable potential $v_c$ is also available for measurement in both terminals. Estimators $E_7$ and $E_8$ inside the terminals compute estimates $\hat{i}_1$ and $\hat{i}_2$, respectively. The intermediate circuit I between the two terminals is realized by a wire of negligible resistance. To design estimators $E_7$ and $E_8$, let us write out Kirchoff's current law for nodes $N_5$ and $N_6$:

$$i_1 = i_3 + i_4 - i_2$$
$$i_1 = \frac{v_c}{R_3} + \frac{v_c}{R_4} - i_2$$

if resistors $R_i$, $i=1,\ldots,4$ are identically set to $R=100$ k$\Omega$ then rearrangement yields:

$$\hat{i}_2 = \frac{2v_c}{R} - i_1$$

Based on measurements of the cable voltage $V_c$ and the input current $i_1$ of terminal $T_9$, an estimate $\hat{i}_2$ can be computed for the input current $i_2$ of terminal $T_{10}$. Due to symmetry, the estimate $\hat{i}_1$ is also available at terminal $T_{10}$. A similar derivation for terminal $T_2$ results in:

$$\hat{i}_1 = \frac{2v_c}{R} - i_2$$

Figure 5:
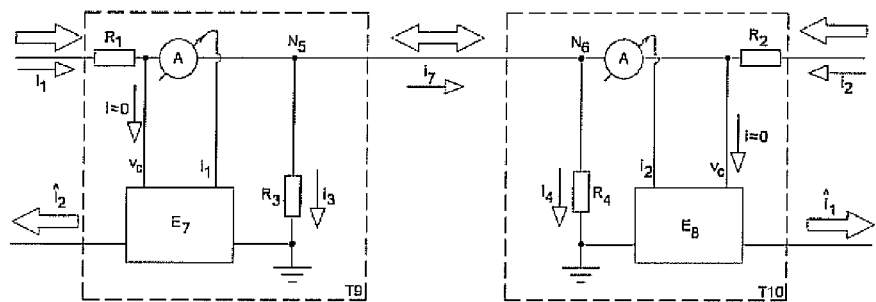
FIG. 5 depicts a simple current sifudu system.

Because the last two equations hold true simultaneously, and they express the estimate as a function of signals measurable inside the terminals, the system shown in FIG. 5 is a sifudu system.

Figure 6:
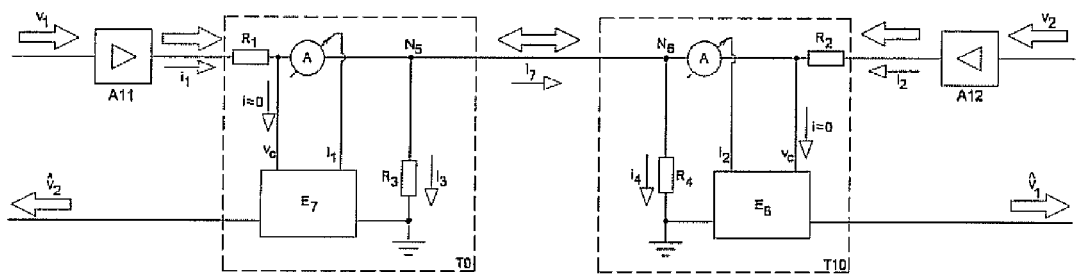
FIG. 6 shows how a current sifudu may be interfaced to a voltage-signal based system.
Figure 8:
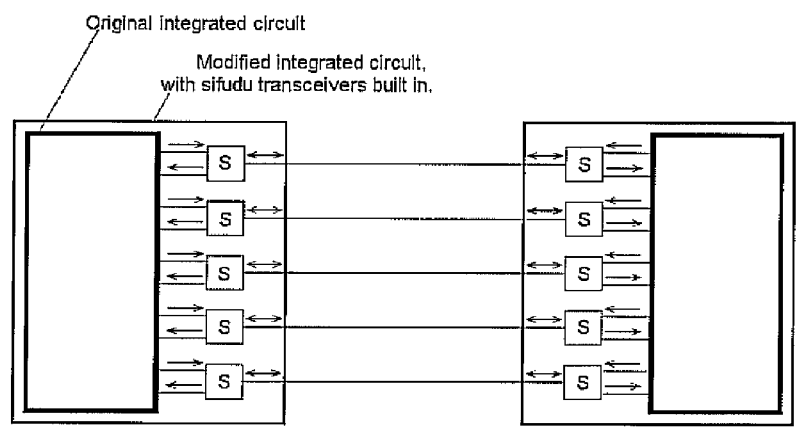
FIG. 8 shows two-terminal communication with five sifudu transceivers (marlked with S) in each terminal.

If only current communication signals are considered, then the circuit shown in FIG. 5 already provides sufficient information for implementation. However, in practice, most communication circuits are interfaced to various signal processing units and digital microprocessors, which typically operate with voltage signals. This suggests the construction of additional circuits that interface the current sifudu transceivers to voltage signal based systems. Such an arrangement is shown in FIG. 6.

Voltage controlled current generator $A_{11}$ converts the voltage signal $v_1$ arriving from the environment into current signal $i_1$. The estimator $E_7$ computes an estimate $\hat{v}_2$ for the input voltage $v_2$ of terminal $T_{10}$.

Figure 7:
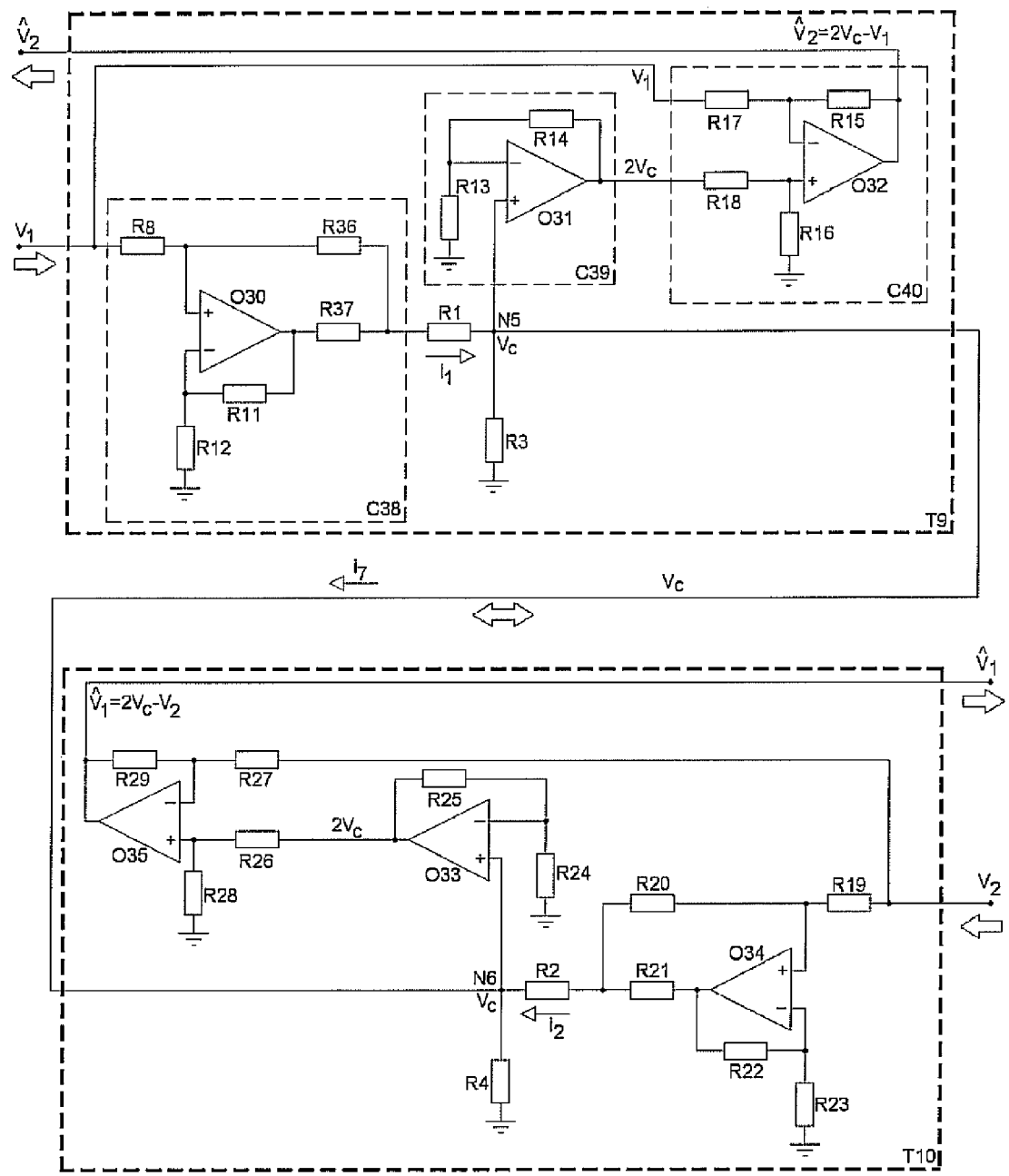
FIG. 7 is an implementation of a current-based sifudu.

A more detailed design for such a system is shown in FIG. 7. The operation of the circuit in FIG. 7 will be discussed in detail. This is one of many possible designs and serves only as an illustration. First, the focus is on the voltage controlled current generator $A_1$. Op-amp circuit $C_{38}$ is a well-known voltage controlled current source. As long as certain conditions are met:

$$R_{12}=R_8=R_{36}=R_{11}>>R_{37}$$

The output current $i_1$ of op-amp circuit $C_{38}$ will be approximately:

$$i_1 \approx \frac{v_{41}}{R_{37}}$$

The resistors are chosen as:

$$R_{12}=R_8=R_{36}=R_{11}=470 \text{ k}\Omega, R_{37}=100\Omega$$

To arrive at the estimates of voltages $v_1$ and $v_2$, Kirchoff's current law is written out for node $N_5$:

$$0 = -i_2 - i_1 + \frac{v_c}{R_3} + \frac{v_c}{R_4}$$
$$\hat{i}_2 = -i_1 + \frac{v_c}{R_3} + \frac{v_c}{R_4}$$

From which:

Due to the voltage controlled current generator in terminal $T_9$:

$$\hat{i}_2 = -\frac{v_1}{R_{37}} + \frac{v_c}{R_3} + \frac{v_c}{R_4}$$

Due to the voltage controlled current generator in terminal T10:

$$\hat{v}_2 = R_{21} \cdot \left(-\frac{v_1}{R_{37}} + \frac{v_c}{R_3} + \frac{v_c}{R_4}\right)$$

The resistors were chosen as: $R_3 = R_4 = R_{37} = R_{21} = 100\Omega$, so:

$$\hat{v}_2 = 2v_c - v_1$$

This arithmetic operation must be performed by estimator $E_7$ in terminal $T_9$. Similarly, estimator $E_8$ in terminal $T_{10}$ must perform:

$$\hat{v}_1 = 2v_c - v_2$$

These arithmetic operations will be discussed in case of $T_9$. Non-inverting op-amp circuit $C_{39}$ with the resistors set to $R_{13} = R_{14} = 10\,k\Omega$ computes the double $2v_c$ of the cable voltage $v_c$. Subtracting op-amp circuit $C_{40}$ with the resistors set to: $R_{15} = R_{16} = R_{17} = R_{18} = 10\,k\Omega$ subtracts $v_2$ from $2v_c$ to arrive at the estimate $\hat{v}_2$ of the input voltage $v_2$ of terminal $T_{10}$.

Yet to be determined are the load resistors of the current generator. These are set to $R_1 = R_2 = 100\Omega$.

As in case of voltage sifudu applications, the op-amps preferably do not operate close to the power supply voltage rails. Otherwise, if the input or the output is close to the rails the op-amps begin to operate non-linearly. The positive and negative power supply voltages of the op-amp circuits are chosen so that the input and output signals do not cause saturation. In this case a symmetrical ±12VDC power supply is used for the op-amps.

SIFUDU NETWORKS

Yet another application of the sifudu transceiver entails the cooperation of a plurality of sifudu transceivers cooperating in concert within a network. Broadly, a "tree structure" is constructed by connecting one or more "chains" into a "central communication node," Using "T-junctions," chains can split into two branches. A "tree" can contain one or more "chains," but only one "central communication node" is required to form a "star" structure.

Networks in Digital Systems

The sifudu transceiver can be built into integrated circuits that form a communication network. Integrated circuits already in use can be redesigned with sifudu transceivers at their pins. Two such modified integrated circuits can communicate with each other through half as many cables, or, conversely, they can send information with twice the rate over the same number of cables.

Figure 9:
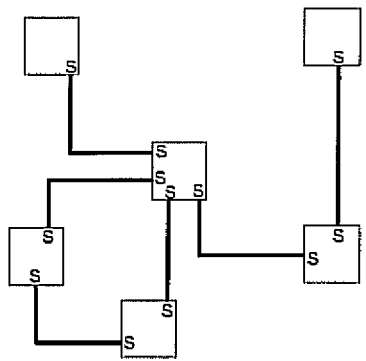
FIG. 9 shows a network of digital devices connected by databuses with sifudu transceivers at the bus terminals.

The utility of the sifudu transceiver is better highlighted in a multinode network. For instance and as shown in FIG. 9, six digital devices are connected through a network of cables indicated with thick lines. Each cable is preferably a flat ribbon cable with a plurality of wires, and each wire is equipped with a sifudu transceiver at both ends.

Figure 10:
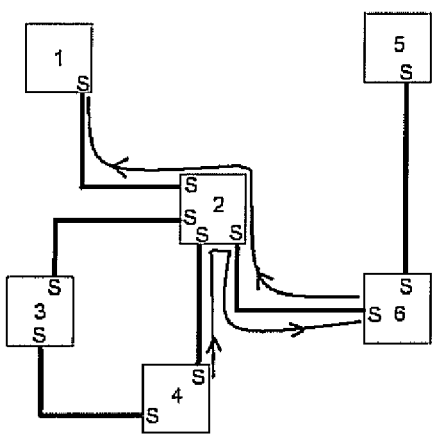
FIG. 10 shows simultaneous communication of several digital devices in a network.

Such a system will facilitate the simultaneous communication of several pairs of digital devices across the network as shown in FIG. 10. The curved lines indicate information flow. A digital device may contain several sifudu transceivers, for example terminal 2 is connected to four flat ribbon cables, each of which may have several sifudu transceivers in terminal 2.

As shown in FIG. 10, terminal 4 transmits a message to terminal 6, through terminal 2. At the same time, terminal 6 transmits to terminal 1 also through terminal 2. Thus, the flat ribbon cable between terminals 2 and 6 participates in simultaneous full-duplex communication. In this scenario, the sifudu transceiver expedites communication by allowing two communication processes to use the same cable at the same time.

Sifudu Network with Star Structure

Figure 11:
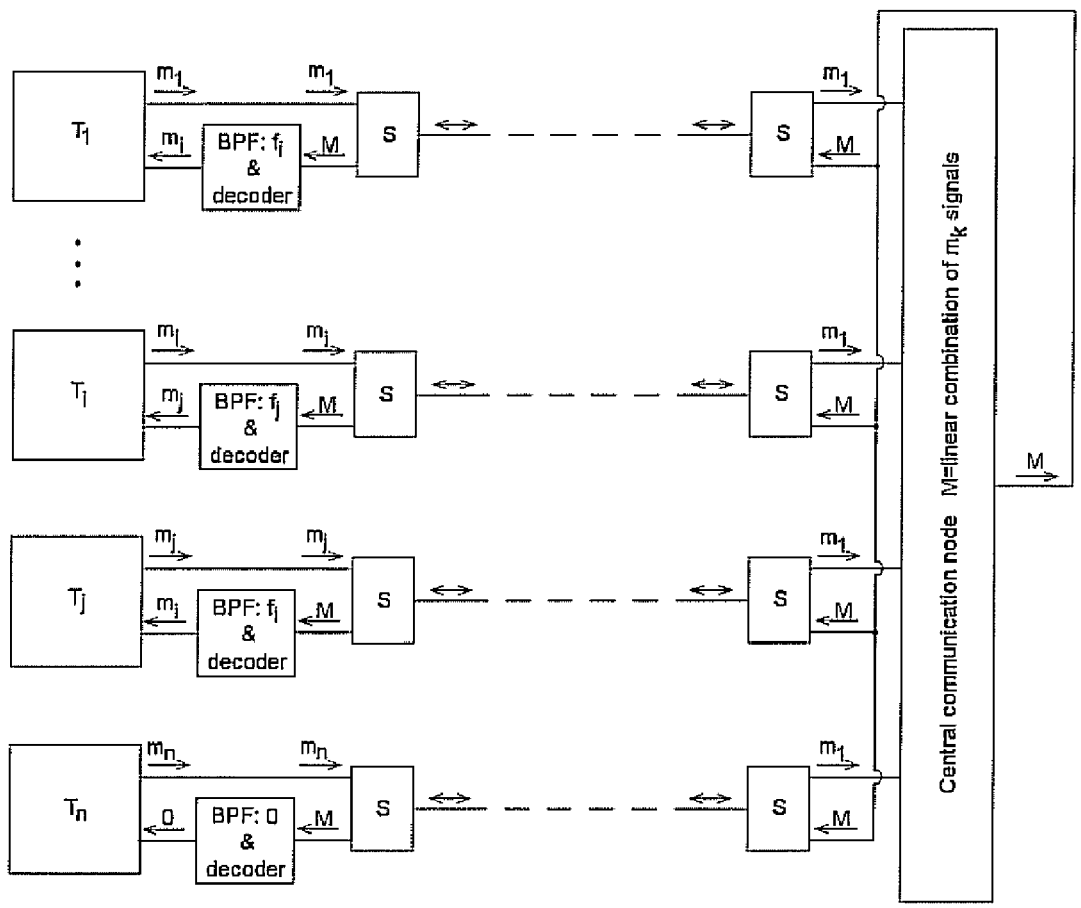
FIG. 11 shows an "n" terminal network in star structure with a joint implementation of sifudu and frequency modulation.

Let us consider the network shown in FIG. 11. The network consists of a central communication node, terminals T1 through $T_n$, two sifudu transceivers and a band-pass filter and decoder for each terminal. The terminals send frequency modulated signals (messages) to each other through the central node, with each terminal transmitting at a given carrier frequency. A pre-specified carrier frequency is assigned to each respective transmitter. Amplitude and phase shift keying can be used to increase the information content of the sine waves sent by any terminal at the frequency of that particular terminal.

When considering the transmission of message mi from terminal $T_i$ to terminal $T_j$, terminal $T_i$ sends signals modulated with carrier frequency $f_i$ to the central node through a pair of sifudu transceivers. The communication node computes some combination of all the incoming messages $m_k$, k=1 ... n, and sends the result M to all terminals through the sifudu transceivers. M, for example, could be the sum of the incoming messages, $m_k$, k=1 ... n. Once the combination M arrives at terminal $T_j$, it is band-pass filtered with a filter (BPF) tuned to the carrier frequency $f_i$ of the sending terminal, $T_i$. The result is decoded to message $m_i$. At the same time, terminal $T_i$ receives message $m_j$ from terminal $T_j$. Note, that terminal $T_1$ also receives message $m_i$ from terminal $T_i$. Capital S abbreviates sifudu transceiver.

Note that any $m_k$(k=1 ... n) of the n messages shown in FIG. 11 can be time multiplexed from the combination of several (P) messages $m_{kp}$, p=1 ... P. This shows the joint implementation of time-multiplexing, frequency modulation and sifudu transceivers. Amplitude modulation and phase shift keying can also be jointly implemented with the sifudu network, thus increasing the information content of the transmitted messages, As FIG. 11 reveals, the terminals are arranged in a star structure around the central node. Let us next consider a linear or chain structure.

Sifudu Network with Linear Structure

Figure 13:
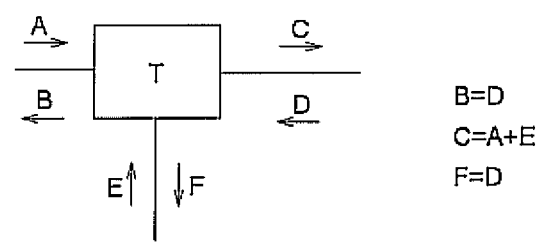
FIG. 13 shows a symbol and function of a T-junction.
Figure 12:
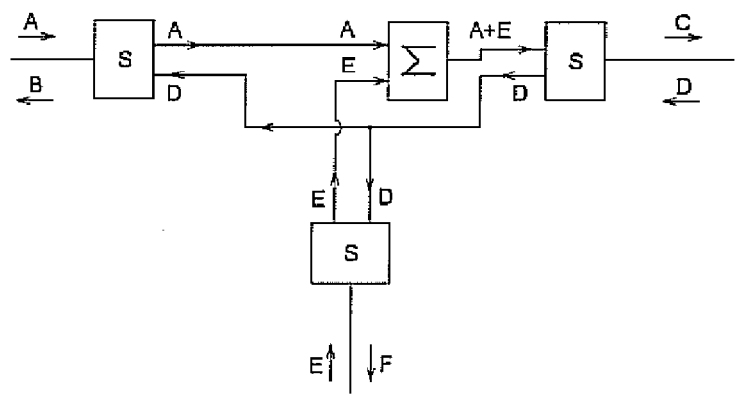
FIG. 12 shows a T-junction formed by three sifudu transceivers and a summing circuit.

This application example of the sifudu transceivers shows how a network with linear structure is preferably constructed. Referring to FIG. 12, the T-junction formed by three sifudu transceivers and a voltage summing circuit, is used as a part of the linear communication structure. The input signals to this circuit are A, D and E. The three output signals are B, C and F. By inspection, B=D, C=A+E, and F=D. A simplified symbol is introduced in FIG. 13.

As illustrated in FIG. 14, a communication system having a linear structure can be created by utilizing the T-junction. However, one skilled in the art would now know that other ways exist to achieve such a linear structure. The basic principle is the same as in case of the network with the star structure: the combination M of all messages $m_i$, i=1 ... n is computed and transmitted to each terminal, For simplicity, this combination is just the sum of all messages. The terminals then band-pass filter and decode the message component addressed to them. Addressing takes place through setting the band-pass filter of the receiver circuit to the carrier frequency of the transmitter circuit. The summing takes place in the T-junctions and in the summing junction close to terminal $T_n$ on the right.

As shown in FIG. 14, terminal $T_1$ receives no messages from other terminals, terminal $T_2$ receives the message $m_1$ sent by terminal $T_1$, terminal $T_{n-1}$ also receives the message $m_1$ sent by terminal $T_1$, and terminal $T_n$ receives the message $m_2$ sent by terminal $T_2$.

As earlier, the various terminals can communicate with each other using one cable in both directions at the same time. Any $m_k$ (k=1 ... n) of the n messages shown in FIG. 14 can be time multiplexed from the combination of several (P) messages $m_{kp}$, p=1 ... P. This shows the joint implementation of time-multiplexing, frequency modulation and sifudu transceivers. Amplitude and phase shift keying can also be jointly implemented with the sifudu network, thus increasing the information content of the transmitted messages.

One may ask why the chain structure explained above is any different from several communication stations, e.g. A through H connected by bidirectional links. If the connection between the neighboring stations was formed by bidirectional links, then each link could carry only one pair of messages at any given time. The chain structure, however, is capable of carrying three or more messages on a single cable, e.g. using the arrangement shown in FIG. 15. Clearly, the link e.g. between stations C and D carries four messages at the same time. The parallel arrangement of several chains forms a bus.

Multiterminal Communication System with Tree Structure

Figure 16:
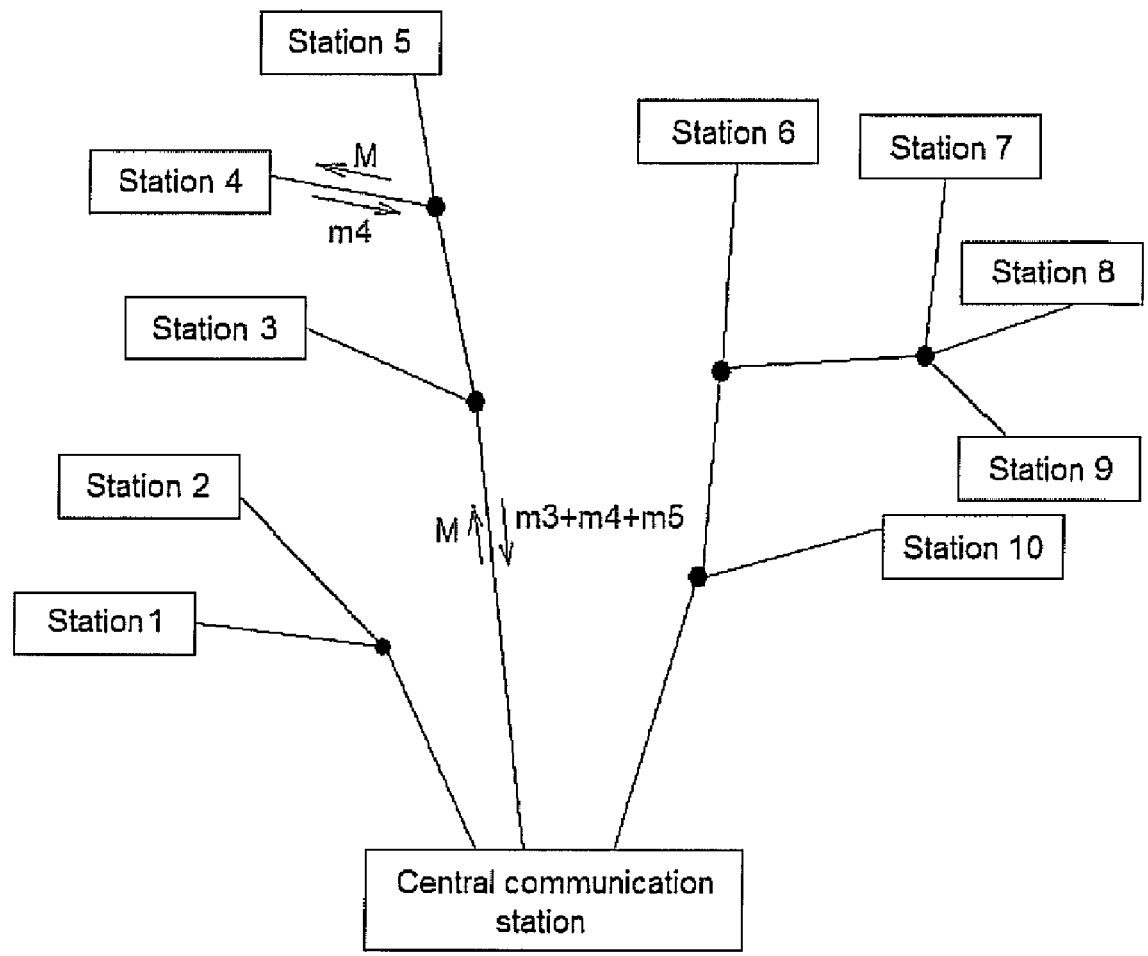
FIG. 16 shows a tree structure according to the invention.

As with the combination of the star and the chain structure, tree structures can also be generated, one possibility of which is depicted in FIG. 16. The operating principle is the same as before: All stations enjoy a common ground not shown in the figure. Station i sends its coded message, $m_i$, i=1 ... N through bidirectional links to a central node. Here, in the simplest case coded means frequency modulated by station i with carrier frequency $f_i$, where each station has a different carrier frequency. The central node sends back the sum of all incoming messages, M to every station. Each station is equipped with a decoder. If the coding process is frequency modulation, than the decoder is a narrow band-pass filter of adjustable frequency and a frequency demodulator.

Suppose station j is the addressee of message $m_i$ sent by station i. (the address information is sent to stations by means not shown in FIG. 16, e.g. an address bus) Then station j will tune its band-pass filter to $f_i$ and will recover message mi from the sum of all messages, M. The large, black dots on the figure indicate T junctions explained earlier.

Note, that e.g. stations 3, 4 and 5 form a chain structure, which was already explained. Several such chain structures are appended to a central communication station in a star arrangement. Also note that although the T-joint facilitates the connection of three branches, two T-joints placed in one network node can connect four, as in case of the node Stations 7, 8 and 9 are connected to.

Multiterminal Communication System with "Woods" Structure

Figure 17:
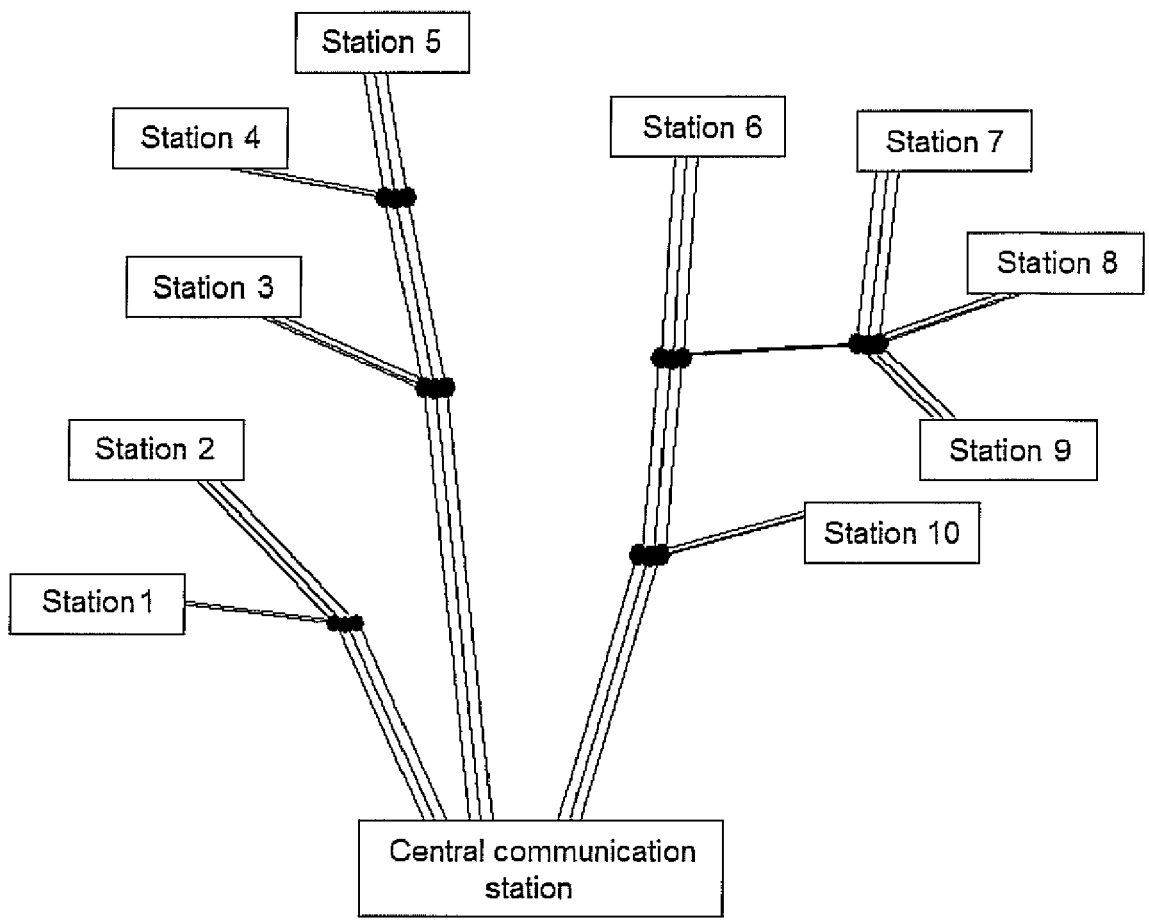
FIG. 17 shows a the woods network structure made from three trees.

Building several such trees, each running data on single lines, and arranging them in a parallel structure, allows the formation of the "woods" structure, where a bus is used for bidirectional signaling. FIG. 17 shows the woods structure made up from three trees.

As earlier, several of the branches of any of the trees in the woods can be used for more than two communication processes at the same time. For instance, Station 1 sends the same signal-set (a vector of three signals) to Station 9 and 10 across three cables at the same time, while Station 9 sends another signal-set to Station 1. In the meantime, Station 3 sends a signal-set to Station 8 and vice versa. Therefore, the three rightmost branch starting from the central communication station carry four messages on each of the three wires (that is, branches) at the same time.

Practical Advantages and Application Examples

The sifudu communication principle realizes simultaneous, bi-directional information flow across a single cable. The invention can be generalized from a pair of two communicating terminals to a network of numerous terminals. The system is simple, generic, inexpensive and is a potential candidate for a broad range of applications. The areas of possible applications include computer architectures, networks of sensors and actuators, telecommunication and land-based phone systems, computer networks, vehicle instrumentation systems to name a few.

All components of the circuit pair can be integrated, so for example one sifudu terminal can be integrated to each of the pins of the databus of microprocessors and all other devices, e.g. RAM memory chips. This will facilitate simultaneous communication between processor and RAM memory. In case of using the sifudu as a databus driver, the sifudu must be augmented with an address decoder that enables operation only when the processor communicates with a particular device.

The sifudu transceivers reduces the number of pins of integrated circuits, and hence reduces their sizes determined by the space the pins take. Indirectly, the sifudu circuit reduces their weight as well. The sifudu pair also reduces the number of conductor wires on printed circuit boards in microprocessor applications, e.g. in personal computers and microcontroller boards.

The sifudu transceivers can save valuable space and weight in aircraft and spacecraft by reducing the number of cables it takes to communicate the same amount of information. The sifudu transceivers may also reduce the size and weight of MEMS devices.

The sifudu transceivers can cut the price of cables in mass-produced systems, where the minor cost of a single cable can add up to significant amounts of money due to the large volume of production.

The sifudu circuit can transmit audio, digital and analog signals across two stations in two directions simultaneously. This makes it possible to use various data compression methods, such as phase shift keying, (PSK) amplitude shift keying, (ASK) frequency shift keying, (FSK) or a combination of these to send several bits of digital information at the same time in each direction across the cable. This is a notable advantage of the sifudu circuit over the digital circuits of bidirectional communication already in widespread use. The latter devices send only one bit of information in a given direction at a time.

The sifudu transceivers can be implemented in conjunction with time domain multiplexing or frequency domain multiplexing techniques. The sifudu transceivers can be configured to operate with voltage or current signals, thus accommodating to e.g. the 4-20 mA current signal communication standard widely used in industry. Two communication lines serviced by a pair of sifudu transceivers each, can also be used in differential communication mode to cancel interference affecting long cables. Further advantages of the sifudu system are that it can be realized in integrated circuits and it easily achieves a signal-to-noise ratio of 40 dB.

Without the use of special, low-noise circuit design techniques, a voltage sifudu circuit may transmit voltage signals ranging between 0.5V and 11.5V with an accuracy of about 0.02V. The current sifudu circuit keeps the absolute error below about 0.04V in the 0V-5.5V range at low signal frequency. The sifudu transceivers can be realized with a single power supply voltage. With a negative and positive power supply voltage, the sifudu transceivers can transmit signals near 0V or near 0 mA, or current and voltage signals that change polarity. It is possible to augment the sifudu transceivers with other parts and arrive at a circuit of greater utility and higher performance,

I claim:

1. A system for achieving simultaneous, full-duplex communication over a single electrical conductor, the system comprising:
   a first transceiver terminal $T_1$ having a first input for receiving a first signal x;
   a second transceiver terminal $T_2$ having a second input for receiving a second signal y;
   a first communication circuit $C_1$ in $T_1$ between the first input and a point A for transmitting a signal representative of x from A to $T_2$ over the single electrical conductor;
   a second communication circuit $C_2$ in $T_2$ between the second input and a point B for transmitting a signal representative of y from B to $T_1$ over the single electrical conductor;
   a first estimator circuit $E_1$ in $T_1$ for measuring one or more signals relative to the point A;
   a second estimator circuit $E_2$ in $T_2$ for measuring one or more signals relative to the point B;
   the first estimator being operative to output a signal $\hat{y}=f_{1e}(s_{11}, \ldots, s_{1P}, x)$;
   the second estimator being operative to output a signal $\hat{x}=f_{2e}(s_{21}, \ldots, s_{2Q}, y)$;
   where:
   $s_{11}, s_{12}, \ldots s_{1P}$ are the signals available for measurement relative to point A;
   $s_{21}, s_{22}, \ldots s_{2Q}$ are the signals available for measurement relative to point B;
   $f_1(s_{11}, \ldots, s_{1P}, x, y)=0; f_2(s_{21}, \ldots, s_{2Q}, x, y)=0$; and
   $\hat{x}, \hat{y}$ are estimates of x and y, respectively.

2. The system of claim 1, wherein the first and second signals are analog or digital signals.

3. The system of claim 1, wherein:
   the first and second communication circuits include a resistor; and
   the variables include the voltages developed across each resistor.

4. The system of claim 1, wherein:
   the first and second communication circuits include current-sensing components; and
   the variables include the currents measured by the current-sensing components.

5. The system of claim 1, further including an intermediate circuit containing active or passive components connected between points A and B.

6. The system of claim 1, including a plurality of transceiver terminals interconnecting the pins of two or more integrated circuits.

7. The system of claim 1, including a plurality of transceiver terminals in network communication.

8. The system of claim 1, further comprising:
   a central communication node including a plurality of transceiver terminals arranged as a star network topology;
   a plurality of stations, each sending messages through a transceiver terminal in simultaneous, full-duplex communication with a respective one of the transceiver terminals of the central communication node;
   the central node being operative to send a combination of all incoming messages back to each station; and
   wherein each station includes a decoder to extract the message intended for that node from the sum received from the central node.

9. The system of claim 8, wherein: the messages from each station are sent using a different carrier frequency; and the decoder in each station includes a band pass filter.

10. The system of claim 1, further comprising:
    three transceiver terminals forming a T junction; and
    a plurality of the T junctions arranged as a linear chain structure.

11. The system of claim 10, including a plurality of star or linear chain structures forming a tree network topology.

12. The system of claim 11, including a plurality of tree structures forming a woods network topology.

13. A method of achieving simultaneous, full-duplex communication over a single electrical conductor, the method comprising:
    receiving a first signal x at a first input of a first transceiver terminal $T_1$;
    receiving a second signal y at a second input of a second transceiver terminal $T_2$;
    providing a first communication circuit $C_1$ in $T_1$ between the first input and a point A;
    transmitting a signal representative of x from A to $T_2$ over the single electrical conductor;
    providing a second communication circuit $C_2$ in $T_2$ between the second input and a point B;
    transmitting a signal representative of y from B to $T_1$ over the single electrical conductor;
    measuring one or more signals relative to the point A and outputting a signal $\hat{y}=f_{1e}(s_{11}, \ldots, s_{1P}, x)$; and
    measuring one or more signals relative to the point B and outputting a signal $\hat{x}=f_{2e}(s_{21}, \ldots, s_{2Q}, y)$;
    where:
    $s_{11}, s_{12}, \ldots s_{1P}$ are the signals available for measurement relative to point A:
    $s_{21}, s_{22}, \ldots s_{2Q}$ are the signals available for measurement relative to point B:
    $f_1(s_{11}, \ldots, s_{1P}, x, y)=0; f_2(s_{21}, \ldots, s_{2Q}, x, y)=0$; and
    $\hat{x}, \hat{y}$ are estimates of x and y, respectively.

14. The method of claim 13, wherein the first and second signals are analog or digital signals.

15. The system of claim 13, wherein:
    the first and second communication circuits include a resistor; and
    the variables include the voltages developed across each resistor.

16. The method of claim 13, wherein:
    the first and second communication circuits include current-sensing components; and
    the variables include the currents measured by the current-sensing components.

17. The method of claim 13, further including the step of interconnecting an intermediate circuit containing active or passive components between points A and B.

18. The method of claim 13, including the step of interconnecting the pins of two or more integrated circuits using a plurality of transceiver terminals.

19. The method of claim 13, including the step of arranging a plurality of transceiver terminals in a network configuration.

20. The method of claim 13, further comprising the steps of:
    providing a central communication node including a plurality of transceiver terminals;

providing a plurality of stations, each sending messages through a transceiver terminal in simultaneous, full-duplex communication with a respective one of the transceiver terminals of the central communication node;

summing of all incoming messages at the central communication node and sending them back to each station; and decoding the message intended for a particular node at that node using the sum received from the central node.

21. The method of claim 20, including the steps of:

using a different carrier frequency for the messages sent from each station; and decoding the messages using a band pass filter.

22. The method of claim 21, wherein the central communication node and stations form a star network topology.

23. The method of claim 21, including the steps of:

interconnecting three transceiver terminals to form a T junction; and arranging a plurality of the T junctions to form a linear chain structure.

24. The method of claim 23, including a plurality of star or linear chain structures forming a tree network topology.

25. The method of claim 24, including a plurality of tree structures forming a woods network topology.

* * * * *

UNITED STATES PATENT AND TRADEMARK OFFICE
CERTIFICATE OF CORRECTION

PATENT NO. : 7,639,598 B2  Page 1 of 1
APPLICATION NO. : 11/668236
DATED : December 29, 2009
INVENTOR(S) : Szabolcs Sovenyi It is certified that error appears in the above-identified patent and that said Letters Patent is hereby corrected as shown below:

Column 3, line 53: replace "marlked" with --marked--

Column 5, line 40: please insert --after rearrangement-- between the last two equations in the series Column 6, line 40: please insert --similarly-- between the two equations Column 8, line 32: replace "generator $A_1$" with --generator $A_{11}$--

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,639,598 B2 | |
| APPLICATION NO. | : 11/668236 | |
| DATED | : December 29, 2009 | |
| INVENTOR(S) | : Sovenyi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Fifth Day of October, 2010

David J. Kappos
*Director of the United States Patent and Trademark Office*